(12) United States Patent
Gölling et al.

(10) Patent No.: US 9,573,679 B2
(45) Date of Patent: Feb. 21, 2017

(54) FLUID ACTUATOR FOR INFLUENCING THE FLOW ALONG A FLOW SURFACE, AS WELL AS BLOW-OUT DEVICE AND FLOW BODY COMPRISING A LIKE FLUID ACTUATOR

(71) Applicant: Airbus Operations GmbH, Hamburg (DE)

(72) Inventors: Burkhard Gölling, Bucholz i.d.N. (DE); Matthias Bauer, Berlin (DE); Wolfgang Nitsche, Gollenberg (DE)

(73) Assignee: Airbus Operations GmbH, Hamburg (DE)

( * ) Notice: Subject to any disclaimer, the term of this patent is extended or adjusted under 35 U.S.C. 154(b) by 460 days.

(21) Appl. No.: 13/860,998

(22) Filed: Apr. 11, 2013

(65) Prior Publication Data
US 2013/0284294 A1 Oct. 31, 2013

Related U.S. Application Data

(63) Continuation of application No. PCT/EP2011/005087, filed on Oct. 11, 2011.
(Continued)

(30) Foreign Application Priority Data

Oct. 11, 2010 (DE) .................. 10 2010 048 123

(51) Int. Cl.
  *B64C 21/04* (2006.01)
  *B64C 21/08* (2006.01)
  *F15C 1/12* (2006.01)
(52) U.S. Cl.
  CPC .............. *B64C 21/04* (2013.01); *B64C 21/08* (2013.01); *F15C 1/12* (2013.01); *B64C 2230/02* (2013.01);
(Continued)

(58) Field of Classification Search
  CPC .. B64C 2230/04; B64C 2230/06; B64C 21/04; B64C 21/08; F15C 1/12; Y10T 137/2229; Y10T 137/2234; Y10T 137/2245; Y10T 137/2251; Y10T 137/2267; Y10T 137/2158; Y10T 137/212; Y10T 137/2224
(Continued)

(56) References Cited

U.S. PATENT DOCUMENTS 3,001,539 A * 9/1961 Hurvitz ............... F15C 1/08
  137/831
3,117,593 A * 1/1964 Sowers, III ........... F15C 1/08
  137/624.14
(Continued)

FOREIGN PATENT DOCUMENTS

DE 1 600 577 2/1971
DE 1 650 186 7/1971
(Continued)

OTHER PUBLICATIONS

German Office Action for Application No. 10 2010 148 123.8 dated Feb. 11, 2011.
(Continued)

*Primary Examiner* — Craig Schneider
*Assistant Examiner* — Josephine Trinidad-Borges
(74) *Attorney, Agent, or Firm* — Jenkins, Wilson, Taylor & Hunt, P.A.

(57) ABSTRACT

The invention relates to fluid actuator for influencing the flow along a flow surface through ejection of a fluid. By means of a like fluid actuator, a continuous flow is distributed to at least two outlet openings in order to generate fluid pulses out of these outlet openings. Control of this distribution takes place inside an interaction chamber which is supplied with fluid flow via a feed line. Into this interaction chamber there merge at least two control lines via control (Continued)

openings to which a respective different pressure may be applied. Depending on the pressure difference at the control openings, the flow in the interaction chamber is distributed to the individual outlet openings.

18 Claims, 10 Drawing Sheets

Related U.S. Application Data

(60) Provisional application No. 61/391,761, filed on Oct. 11, 2010.

(52) U.S. Cl.
CPC .......... *B64C 2230/18* (2013.01); *Y02T 50/166* (2013.01); *Y10T 137/212* (2015.04); *Y10T 137/2158* (2015.04); *Y10T 137/2224* (2015.04); *Y10T 137/2229* (2015.04); *Y10T 137/2234* (2015.04); *Y10T 137/2245* (2015.04); *Y10T 137/2251* (2015.04); *Y10T 137/2267* (2015.04)

(58) Field of Classification Search
USPC ....... 137/834, 835, 837, 838, 841, 821, 814; 244/204, 207, 212, 130, 117 A; 73/147
See application file for complete search history.

(56) References Cited

U.S. PATENT DOCUMENTS

| | | | | |
|---|---|---|---|---|
| 3,340,896 A | * | 9/1967 | Mon et al. | 137/624.13 |
| 3,396,619 A | * | 8/1968 | Bowles et al. | 137/1 |
| 3,430,895 A | | 3/1969 | Campagnuolo | |
| 3,504,691 A | | 4/1970 | Campagnuolo | |
| 3,528,442 A | | 9/1970 | Campagnuolo | |
| 3,536,084 A | * | 10/1970 | Dorsey | F15C 1/08 137/820 |
| 3,613,707 A | * | 10/1971 | Heath | F15C 1/10 137/818 |
| 3,675,672 A | * | 7/1972 | Freeman | E02B 13/02 137/804 |
| 7,128,082 B1 | | 10/2006 | Cerretelli et al. | |
| 7,735,749 B2 | * | 6/2010 | Tippetts | B05B 1/08 137/624.27 |

FOREIGN PATENT DOCUMENTS

| | | | |
|---|---|---|---|
| DE | 60 2006 001 040 | 7/2009 | |
| GB | 1145304 A * | 3/1969 | ................ F15C 1/12 |
| WO | WO 2004/047997 A2 | 6/2004 | |
| WO | WO 2012/048853 | 4/2012 | |

OTHER PUBLICATIONS

EPO Office Action for Application No. EP 11 767 934.0 dated Jun. 18, 2014.
Written Opinion and Search Report for Application No. PCT/EP2011/005087 dated Feb. 6, 2012.
Chinese Office Action for Application No. 201180058977.3 dated Dec. 31, 2014.

* cited by examiner

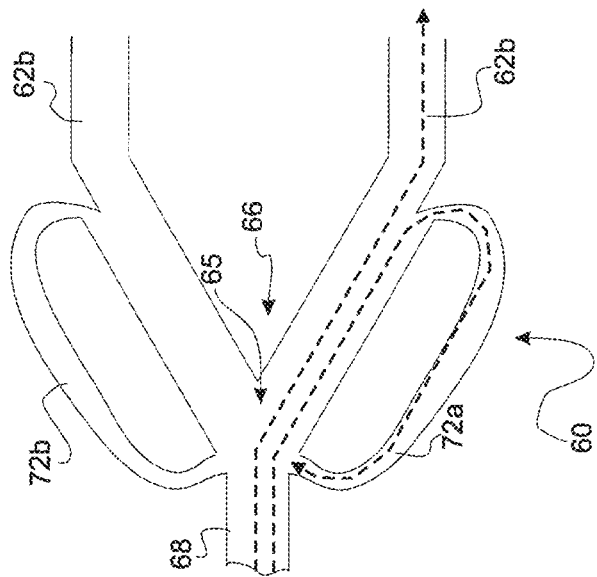
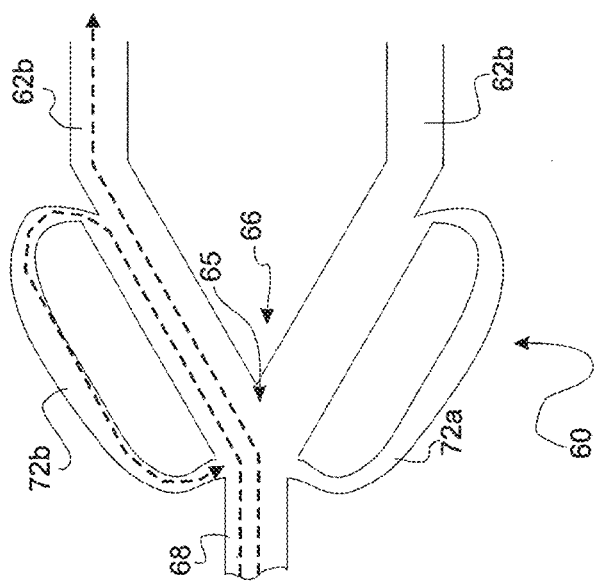

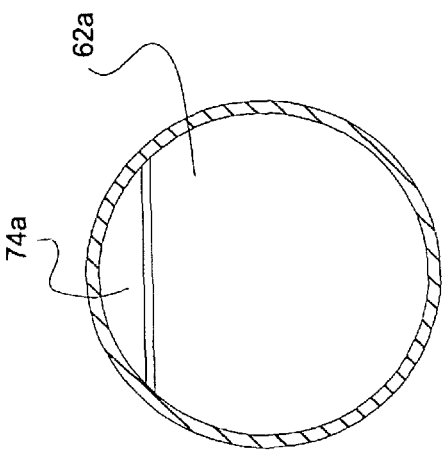
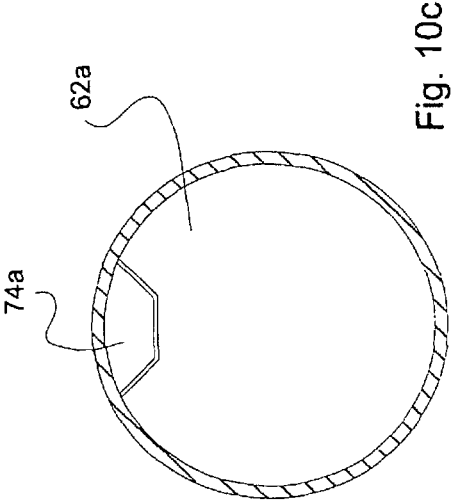
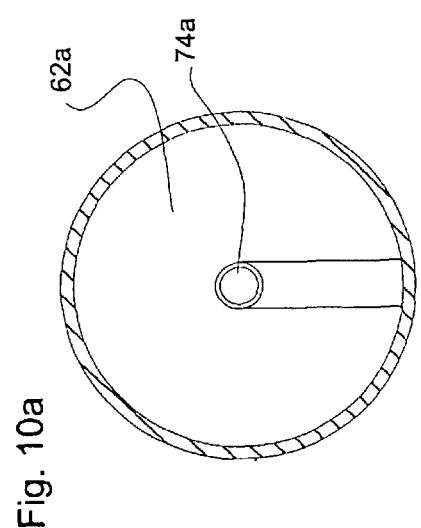

FLUID ACTUATOR FOR INFLUENCING THE FLOW ALONG A FLOW SURFACE, AS WELL AS BLOW-OUT DEVICE AND FLOW BODY COMPRISING A LIKE FLUID ACTUATOR

CROSS-REFERENCE TO RELATED APPLICATIONS

This application is a continuation of and claims priority to PCT Application No. PCT/EP2011/005087, filed Oct. 11, 2011, which claims the benefit of the filing date of German Patent Application No. DE 10 2010 048 123.8, filed Oct. 11, 2010, and of U.S. Provisional Patent Application No. US 61/391,761, filed Oct. 11, 2010, the disclosures of which applications are hereby incorporated by reference herein.

TECHNICAL FIELD

The invention relates to a fluid actuator for influencing the flow along a flow surface by ejecting a fluid flowing through the fluid actuator. Furthermore, the present invention relates to a blow-out device comprising at least one fluid actuator as well as a flow body comprising a plurality of outlet openings.

BACKGROUND

Such fluid actuators are fundamentally known for influencing the flow along a flow surface of a flow body, for example. Such fluid actuators are utilized, e.g., in order to cause flows to adhere longer along a flow body, or to reattach a flow that has detached or separated from a flow body to the latter. This is expedient and advantageous, for example, when the known fluid actuators are employed with flow bodies having the form of adjustable flaps, control flaps, or other parts of a wing of an aircraft.

In order to reattach flows that have already separated to a flow body, it is known to realize the fluid actuators in such a way that a pulse-type ejection from the openings of a fluid actuator takes place. Pulse-type ejection of fluid from the openings of a fluid actuator has the consequence of a previously detached flow being reattached to the top side of the flow body by causing the ejected fluid flow to become turbulent. In other words, energy-rich flow spaced apart from the flow body is approached to the flow body again and thus reattached to the flow body.

In order to enable the pulse-type ejection of the fluid, it is already known that openings corresponding to each other, for instance pairs of openings of a fluid actuator, cooperate in such a manner that a fluid pulse and thus an abrupt outflow of the fluid, alternatingly takes place through these openings. In this way, starting out from a continuous fluid flow a distribution to two openings—i.e. a pair of openings—of a fluid actuator may take place so that an uninterrupted, continuous fluid flow may be utilized for creating a pulse-type ejection. The known fluid actuators utilize valves for the distribution between the two openings of the fluid actuator. Such valves include a multiplicity of mechanical components which must be movable for switching back and forth between the two outlet openings of the fluid actuator. These mechanical components and thus the valves are correspondingly subjected to high mechanical strains in dependency on the frequency of the pulsation between the two outlet openings of the fluid body. Due to these high mechanical strains the valves are expendable parts that have to be replaced at comparatively short-term intervals on the one hand, while on the other hand their required functionality has to be examined at even shorter intervals. The risk of a failure of such valves accordingly is a problem that is problematic in regard of the approval of such a fluid actuator in aviation. In addition, the individual mechanical components of the valve result in a relatively complex construction that brings about high manufacturing costs because of a multiplicity of individual parts. Aside from high costs, the mass of the parts and the complexity of the construction moreover result in an increased weight, which is a drawback in the case of aircraft on account of the concurrently increased fuel consumption.

From U.S. Pat. Nos. 3,504,391 and 3,528,442 fluid actuators are known which comprise a control stage and a single end stage connected to this control stage. The control stages comprise two outlet passages, each of which has a feedback line associated thereto. The outlet passages merge into a chamber which is in connection with the end stage for the purpose of driving the latter.

From DE 60 2006 001 040 T2 a fluidic oscillator is known which comprises a plurality of oscillator elements arranged adjacently side by side along a wing span extension direction of an aircraft wing. To each oscillator element two feedback lines are associated, both of which are connected to feedback lines of the respective oscillator elements immediately adjacent thereto.

SUMMARY

It is an object of the present invention to resolve the drawbacks mentioned in the foregoing. In particular it is an object of the present invention to provide a fluid actuator that is capable of managing with as few mechanical components as possible, particularly as few movable components as possible, in order to keep the failure probability of the fluid actuator low and reduce the costs thereof, and in order to extend the maintenance intervals.

The above object is achieved through a fluid actuator having the features of independent claim 1 and through a blow-out device having the features of independent claim 11 and through a flow body having the features of independent claim 13. Advantageous realizations result from the sub-claims appended to the respective independent claims.

A fluid actuator of the invention for influencing the flow along a flow surface, particularly by pulsating ejection of a fluid flowing through the fluid actuator, comprises a multiplicity of outlet devices each having at least two outlet openings as well as at least two outlet lines merging into the outlet openings. In the framework of the present invention it is also possible to provide more than two outlet openings which correspond to a corresponding larger number of outlet lines The fluid actuator of the invention further comprises at least two interaction chambers which are in fluid-communicating connection with separate outlet openings via respective separate outlet lines. Furthermore, a flow dividing device advantageously arranged at the inlet of the outlet lines is present in each interaction chamber. The flow dividing devices serve to conduct fluid flowing from the interaction chambers via the flow lines into the single outlet lines and thus to the individual outlet openings, i.e. to divide the flows merging from a feed line into the interaction chambers. The flow dividing devices accordingly divide the arriving flow inside the interaction chambers and in this way distribute it into the flow lines or the outlet lines, to thus generate the desired pulses at the outlet openings.

In addition, in a fluid actuator of the invention a feed line may advantageously be provided which is realized for supplying fluid at a feed pressure into the interaction chambers. The feed line may receive pressurized air, for instance from external devices such as the engine of an aircraft, and conduct it into the interaction chambers. This supply pressure corresponds to a substantially continuous fluid flow which flows into the interaction chambers via the feed line. This substantially continuous flow from the feed line is divided by the flow dividing devices inside the interaction chambers, so that starting out from a single fluid flow a distribution to the plurality of the outlet lines and thus to the plurality of the outlet openings takes place.

In a fluid actuator of the invention, control lines for supplying fluid at respective different control pressures into the interaction chamber, particularly via at least one respective control opening merging into the interaction chamber, are furthermore present in order to alternatingly bring about the flow of the fluid at least majoritarily into one of the flow lines or outlet lines, respectively. The control lines merge into the respective control opening and thus into the interaction chambers. A different control pressure, i.e. a corresponding static pressure of the flow that is present in the control line prevails at each control opening. These different control pressures serve—as will be described hereinbelow—the interaction with the fluid flow from the feed line in the interaction chambers in order to perform the distribution by means of the flow dividing device inside the interaction chamber. Here the ratio of the mass flow in the control line to the feed line may be from 1:10 to 1:20, so that a comparatively low control mass flow allows to control a much larger main mass flow.

Furthermore a control flow dividing device is provided which comprises a control pressure varying device to which the control lines are connected for mutually influencing the flow. Each control line comprises a feedback line merging into the control line. In this way, if a fluid flow is supplied into the control flow dividing device, an alternating control flow from one respective control line and thus a pulsating flow in the flow lines is brought about.

The at least two interaction chambers are in fluid-communicating connection with separate outlet openings via respective separate outlet lines, and the control lines comprise branchings merging via corresponding control openings into all of the interaction chambers so as to provide respective different control pressure there. Due to the simple configuration in accordance with the invention of the control pressure varying device it is particularly simple in regard of its controllability. A multiplicity of interaction chambers and thus also a multiplicity of outlet openings may be controlled by a single control pressure varying device. In this way it is ensured that the substantially identical pulse frequency may be applied via a multiplicity of outlet openings, for control of all of the outlet openings is effected by means of a common control pressure varying device. In situations of use in which a substantially identical pulsation distribution via a multiplicity of outlet openings is desired, it is in this way possible to provide a system having a simple construction. At the same time, construction space which would otherwise have to be reserved for the accommodation of a multiplicity of control pressure varying devices is reserved in this way. As it is possible to generate a pulsation directly at the outlet openings, the detour via an interaction chamber is not necessary, so that the fluid actuator of the invention is particularly energy efficient.

For the distribution of the flow, the interaction chamber of a fluid actuator of the invention advantageously is configured such that when fluid is supplied via the control line at respective, alternatingly different control pressures at the control openings, the fluid flowing through the feed line is correspondingly deflected, inside the interaction chamber, majoritarily into a respective outlet line in an alternating manner. In other words, the interaction chamber is realized such that owing to alternating differences in the control pressures at the control openings, different outlet lines are supplied via the flow lines with fluid flow from the feed line, and thus the outlet opening connected in fluid-communicating manner to the respective outlet opening is supplied with a fluid pulse. Thus, the alternation of the different control pressure at the control openings inside the interaction chamber corresponds to the alternating distribution of the fluid of the flow from the feed line into the interaction chamber and thus to the alternating discharge of fluid pulses from the respective outlet opening of the outlet device. The alternating discharge and the previously mentioned requirements, i.e. particularly the alternation of the control pressures, may take place periodically, i.e. at a harmonic frequency. The frequency may be situated in a range from 50 Hz to 250 Hz. Nevertheless an operation at a frequency in a range from 140 Hz to 160 Hz is particularly effective. It is, however, also possible for the pulses from the outlet openings and thus also the pulses of the control pressures to be generated in an irregular manner, i.e., to follow a combination of harmonic frequencies.

In a fluid actuator of the invention a minimum of mechanical parts is utilized in order to generate the different control pressures. In particularly simple embodiments of the present invention no mechanical components are required at all. To this end, a fluid actuator of the invention comprises a control pressure varying device which is equipped with a control feed line and a control flow dividing device. The control flow dividing device is in fluid-communicating connection with the control feed line and with the control lines and is thus capable of distributing the flow from the control feed line to the control lines.

In other words, in a fluid actuator of the invention the at least one interaction chamber is advantageously configured such that by the supply of fluid through one of the control lines in a greater degree than through the other control lines the fluid flowing through the supply line correspondingly is deflected majoritarily into one respective outlet line associated to this control line in an alternating manner. A fluid actuator of the invention furthermore comprises a control pressure varying device which comprises a control supply line, the control lines, and a control flow dividing device. The control flow dividing device is provided with a branching section for branching the flow from the control feed line into the control lines. Furthermore at least two feedback lines are provided which are each connected to the respective control line through a control line outlet device situated downstream from the branching section and at least one control line inlet device situated in the range of the branching section, which are arranged in each control line downstream from each control line outlet device in the direction of flow. The control pressure varying device advantageously is configured such that a control flow directed transversely to the flow in the control feed line exits from the respective control line inlet device so as to majoritarily divert the flow in the control feed line into a respective control line situated opposite the control line inlet device. Furthermore, the control pressure varying device advantageously is configured such that the diversion into the control lines and consequently also to the outlet lines takes place successively and alternatingly.

The diversion of the flow inside the supply line into a respective control line opposite the control line inlet device should be understood to the effect that the outflow of fluid from the control feed line at least partially causes the respective flow to change over. In other words, at least one feedback line is allocated to each control line, with the control line inlet device causing the flow from this feedback line and thus from the control line allocated to this control line inlet device to change over into the opposite control line, i.e. into the other control line. In this way the basic operation of the present invention is brought about. This basic operation shall be explained in more detail in the following.

In order to be able to apply different control pressures to the control openings inside the interaction chamber, switching over of the respective fluid flow must take place in the control pressure varying device. In accordance with the invention, this switching over takes place in the absence of mechanical components. In order to ensure this, such switching over is performed by fluidic control, as it were. Here a part of the fluid flow is withdrawn from the respective control flow, i.e. the fluid flow flowing from the control feed line through one of the two control lines as far as into the two control openings. This withdrawal takes place via the control line outlet device which in particular comprises a control line outlet opening for withdrawing a part of the fluid flow from the fluid flow in the respective control line.

The withdrawn part of the control fluid flow is returned through the feedback line in association with the respective control line, i.e., it is transported in the opposite sense relative to the direction of flow in the respective control line. Such transport takes place with the aid of the kinetic energy contained in the control flow, i.e. the corresponding control pressure in this control line. Once the return flow in the feedback line reaches the end of the latter, it exits there from the control line outlet device. This exit takes place in a position situated upstream from the control line inlet device relative to the direction of flow in the respective control line.

The respective control line outlet device is configured such that it comprises in particular a control line outlet opening which discharges the fluid, i.e. the fluid flow, from the respective feedback line substantially transversely to the direction of flow at the outlet location of the control line outlet device. In particular an angular discharge of the fluid flow from the feedback line is advantageous, which thus enters transversely to the flow in the flow dividing device or the branching section, respectively, so that the flow in this range is influenced. Influencing is such that the two flow vectors of the fluid flow flowing from the control line outlet device and the fluid flow from the control feed line add up to a flow vector which diverts the flow from the control feed line into the other control line, i.e. into the control line opposite the corresponding control line outlet device.

Diversion of the flow substantially has two crucial consequences for the operation of the fluid actuator of the invention. On the one hand, the fluid flow in the first control line is hereby reduced significantly. The fluid flow in the corresponding feedback line to the first control line is hereby also reduced significantly, so that the feedback is reduced to a minimum or eliminated entirely. At the same time, as a result of increasing the flow or of a higher volume flow in the second control line, the function of the feedback is started there, as was previously described for the first flow line. In particular a part of the flow from the second control line now arrives in this way via the corresponding second control line inlet device in the corresponding second feedback line and flows out substantially transversely to the direction of flow in the control supply line, particularly in the branching section of the latter, from the corresponding second control line outlet device of the second feedback line. Due to this outflow, the flow in the branching section is once more diverted to the opposite control line, which is into the first control line in this exemplary realization.

Starting from this situation the entire process repeats itself, so that a periodical alternating operation between the two control lines takes place. The time period required by this alternating operation for switching over between the individual control lines, in other words the alternation frequency or also in the purely harmonic case the pulsation frequency, may be influenced by the longitudinal and cross-sectional geometries of the control lines, the longitudinal and cross-sectional geometries of the respective control line inlet devices and control line outlet devices, as well as the longitudinal and cross-sectional geometries of the feedback lines. Here it may be advantageous if these longitudinal and cross-sectional geometries are substantially identical among the individual control lines, so that lastly a substantially homogeneous frequency for the to-and-fro swing of the main fluid flow or of the main fluid flows is brought about at the outlet openings in the alternating operation between the respective associated two control lines. It may, however, also be advantageous if the diversion from the associated first control line into the second control line takes place at a different velocity than in the reverse case. Hereby it is possible, as it were, to individually adjust a different temporal distribution of the pulsation to the allocated outlet of the associated main fluid flow, but also for the main fluid flow associated to each outlet opening; in other words, a temporally weighted pulsation that is specific for the outlet openings, or that is temporally not distributed equally to all of the outlets, can be generated or is generated.

With regard to the direction of flow in each control line, each control line inlet device is situated downstream from each control line outlet device, as it were. In this way the respective feedback line may then be activated by the uptake of fluid flow when the corresponding control line is occupied by the greater quantity of fluid from the fluid flow from the control feed line. In this way the alternation of the main fluid flow per outlet opening in an alternating operation as explained in detail in the foregoing is brought about.

The respective openings of the control line outlet devices and of the control line inlet devices may present very different geometrical shapes. Thus, the opening cross-sections may, for example, present a substantially planar cross-section, or also curved opening areas. In principle it is advantageous if the control line inlet devices, particularly their control line inlet openings, present a cross-section that is substantially directed against the flow in the control line. An orientation against this flow allows to trap a significant portion of this fluid flow and conduct it automatically, and thus in the absence of any pump or compressor, into the corresponding feedback line.

For the operation in accordance with the invention as explained in the foregoing it is not decisive which one of the two control lines is supplied first with the greater proportion of the fluid flow from the control feed line. What is crucial is that one of the two control lines inherently has such a starting position. As such fluid actuators can never be made to be a hundred per cent identical in their manufacture and can never can be made to be a hundred per cent symmetrical with regard to their control lines, this automatically results in a manufacture-related asymmetry, i.e., a manufacture-related unequal formation of the individual control lines, particularly of the branching sections. Due to this manufacture-related asymmetry, one of the two control lines will fundamentally always be preferred in terms of fluid dynamics. This one preferred control line forms the starting point for the alternating operation between the two control lines discussed in the foregoing. Here it may happen that particularly in the presence of minor inaccuracies of manufacture the pulsation rate, i.e. the degree of distribution to the individual control lines, will increase with an increasing number of alternations. In other words, the alternating operation between the two control lines settles through a starting phase until it reaches a quasi-stationary state for the alternation between the two control lines. Such settling may be in respect of both the frequency and the rate of distribution among the control lines.

It may be advantageous in a fluid actuator of the invention if the control line inlet device is at least partly directed against the direction of flow of the fluid flowing from the control feed line to the control line associated to the respective feedback line. Furthermore, this control line inlet device is situated in this flow, so that a part of this flow enters into the respective feedback line. In other words, what is happening here is that a part of the flow for the feedback line is intercepted, so that the control line inlet device including the corresponding control line inlet opening may in a sense be understood to be an intercepting device for the feedback flow. The orientation of the corresponding control line inlet opening of the control line inlet device is here defined, for example, through its normal vector in the opening cross-section which may be directed substantially against the direction of flow in the respective control line. Such an orientation against the direction of flow may in principle be configured substantially in parallel with the direction of flow, but also at an angle with it. What is excluded in such an embodiment is the possibility of the control line inlet opening having a cross-section with a normal vector placed substantially transversely, i.e. substantially perpendicularly to the direction of flow. In such a case the proportion of the flow entering from the control line into the respective feedback line would be too low for establishing the desired alternating operation.

It may moreover be advantageous in a fluid actuator of the invention if a throttle valve is arranged in at least one of the feedback lines in order to influence the velocity of the flow in this feedback line. Influencing the velocity in the feedback line has the consequence that the time required by the fluid flow for travelling from the control line outlet device to the control line inlet device may be varied. Such varying is possible by throttling the flow inside the feedback line by means of the throttle valve. In this way the time period until the changeover of the flow in the branching section to the control line opposite the control line outlet device is varied. Hereby it is possible to directly vary the alternation frequency between the control lines and thus indirectly the pulsation frequency at the outlet openings of the outlet device. The flexibility of such an embodiment is thus clearly enhanced.

It may furthermore be advantageous in a fluid actuator of the invention if at least one throttle valve for changing the flow velocity of the flow in the control feed line and thus of the fluid distributed to the control lines is arranged in the control feed line. Such a throttle valve serves to reduce the velocity of the flow in the control feed line. Particularly at constant volume flows resulting from the bleed air of an engine, for example, it is possible in this way to adjust from a maximum entrance velocity to a defined flow velocity in the control feed line by means of the throttle valve.

When a multiplicity of fluid actuators is provided in a flow body, each throttle valve may also be adjusted fixedly for each fluid actuator. For example, the throttle valve may be constituted by an orifice which decelerates an incoming volume flow to a certain percentage of its arriving flow velocity. When a multiplicity of fluid actuators of the present invention is provided, it is possible in this way to adjust a fluid flow profile across the course of the fluid actuators of the invention in a particularly simple manner, particularly if the throttle valve is configured as an orifice without any mechanically movable component. For each fluid actuator a separate volume flow for the fluid flow is preadjusted by means of the orifice opening, i.e. by way of the degree of opening of the throttle valve. When the overall pressure of the supply is increased, the volume flow at each individual fluid actuator rises, however the relative ratio between the volume flows of the individual fluid actuators is preserved. Thus it is possible to inventively preadjust volume flow profiles in a particularly simple manner by means of a multiplicity of fluid actuators of the invention.

It may furthermore be advantageous in a fluid actuator of the invention if the interaction chamber has convexly curved walls when viewed in the direction of the outlet lines from the interior of the interaction chamber. Applying the flow to a respective one of these walls may then result in a stable flow along this wall into the respective outlet line if the lowest control pressure of all the control lines prevails in the control line merging at the respective wall. Such convexly curved walls are in particular Coanda walls which form a Coanda flow along that wall. The Coanda flow is characterized by the fact that once a flow has been applied to such a wall, it flows stably along the latter until a deflection of the flow, i.e. a separation of the applied flow from that wall is actively produced. It is therefore sufficient if small and/or temporally short variations of the control pressure difference, particularly at alternating control pressure difference directions, forcibly bring about a sudden changeover of the main flow from the feed line into the other outlet line, along and in the direction of the opposite wall.

Another advantage of walls curved in this manner is that the proportion of the flow conducted into the subsequent outlet line rises. While the fundamental presence of a minimum pressure difference is sufficient in the case of the control lines, it may be advantageous for the purpose of increasing the efficiency of the fluid actuator if a largest possible proportion of the fluid flow is conducted from the feed line into a respective one of the outlet lines so that the main part of the flow is output from one of the outlet openings during a pulse phase while substantially hardly any fluid flows out from the other outlet opening(s). In other words, a distribution of more than 80%, particularly more than 85%, in a preferred manner more than 90% to a single outlet line and thus to a single outlet opening is advantageous. In this way greater pulse differences are created between the outlet openings, so that the effect of the pulsation and thus the effect of influencing the flow by means of the fluid actuator of the present invention is optimized.

It may also be advantageous in a fluid actuator of the invention if the control feed line of the control pressure varying device has convexly curved walls when viewed in the direction of the control lines from the interior of the control feed line. In this way the application of the flow to a respective one of the walls results, in the same manner as described in the foregoing for the interaction chamber, in the formation of a stable flow along this wall into the respective control line if a control line situated in continuation of this wall is majoritarily supplied with flow by the alternatingly distributed flow from the control feed line. This curved wall is in particular a Coanda wall, with the flow generated along this wall accordingly being a Coanda flow in the control pressure varying device. In this way it is possible even with a low distribution performance on the part of the control line outlet devices to majoritarily distribute relatively large proportions of the arriving flow from the control feed line to one of the control lines, so that even with a low total volume flow from the control feed line a relatively large control pressure may be generated at one control line and a correspondingly lower control pressure at the other control line. In this way it is possible even with a relatively low volume flow from the control feed line to generate a sufficient relative pressure between the individual control pressures at the control openings.

Another subject matter of the present invention is a blow-out device comprising at least one fluid actuator of the invention. In such a blow-out device a pressurized air supply device is furthermore provided which comprises a control supply line which is in fluid-communicating connection with the control feed line and/or comprises a supply line which is in fluid-communicating connection with the feed line. The pressurized air supply device may, for example, be a connection to the engine of an aircraft from which bleed air is conducted via the supply line or the control supply line to the feed line or to the control feed line, respectively. In more simple realizations it is, however, also possible for the pressurized air supply device to be a simple opening on a flow body which serves as an air inlet and thus receives an enveloping flow of the flow body, to serve in this manner as a pressurized air supply device. When used for flow bodies and for influencing the flow at the top side of such flow bodies, such an opening may be arranged, e.g., at the bottom side of a flow body. In such a variant the provision of a throttle valve is advantageous, particularly a variable throttle valve, for different admission pressures in the respective supply line have to be expected owing to changes in air pressure or changes of speed of the aircraft.

It may be advantageous in a blow-out device of the invention if a throttle valve for influencing the flow velocity in the control supply line and/or in the supply line is arranged in the control supply line and/or the supply line. Such a throttle valve is expedient particularly if fluctuations in the pressurized air supply from the pressurized air supply device are to be expected. In this way the pulsation at the outlet openings, or the pulsation frequency controlled by the control feed line and the flow velocity prevailing in the latter is prevented from varying in an uncontrolled manner. In other words, in the event of an overabundance of pressurized air from the pressurized air supply device, the throttle valves serve the purpose of adjusting the corresponding flow velocity necessary for the desired operation, particularly for an optimum operation of the fluid actuator of the invention. In the event of a very large overabundance of pressurized air from the pressurized air supply device, mechanical damage to the fluid actuator or even a mechanical destruction thereof is also prevented in this manner.

It may furthermore be advantageous in a blow-out device of the invention if a compressor for influencing the flow velocity in the control supply line and/or the supply line is arranged in the control supply line and/or the supply line. The compressor has the opposite effect of the throttle valve. It serves not to throttle, i.e. reduce the flow velocity, but to increase the flow velocity in the respective supply line. Particularly in low-speed flight situations of an aircraft, or for instance in the cruising flight of an aircraft in the presence of low external pressure due to great heights, it may be advantageous to assist the pressurized air generation having the form of an opening on the bottom side of a flow body if it provides insufficient pressurized air. Here an interaction of throttle valve and compressor allows for the highest variability in a blow-out device of the invention, for both a deceleration of the flow as well as an acceleration of the flow are made possible. In this way a substantially continuous flow profile may be obtained both in the control supply line and in the supply line, and thus in the control feed line as well as in the feed line. Accordingly it is possible to also obtain a continuous operation of the pulsation and thus a substantially unambiguously defined functioning of the fluid actuator of the invention.

It is, of course, also conceivable for more than one fluid actuator to be arranged in the blow-out device of the invention. In particular at least two fluid actuators of the present invention are provided, and the control supply line is in fluid-communicating connection with the control feed lines of the fluid actuators and/or the supply line is in fluid-communicating connection with the feed lines of the fluid actuators. In other words, the supply line and/or the control supply line are central supply lines for all of the fluid actuators. This considerably reduces the complexity and the installation expenditure for a blow-out device of the invention. Only the connections to the respective supply device need to be provided for each fluid actuator. If, for instance, a multiplicity of fluid actuators of the invention are to be distributed over the wing span direction of a wing of an aircraft, there is no need for an individual connection of each fluid actuator. It is rather sufficient if one respective supply line for the control pressure varying device and the interaction chamber is routed along the wing span direction of the wing. In each desired location of a fluid actuator of the invention, connections are provided on the supply line, or on the control supply line, whereby the respective fluid actuator may be taken into fluid-communicating connection.

Such an embodiment may be simplified further if the control supply line and the supply line are constituted by a common supply line in a blow-out device of the invention. In other words, the entire supply line in the wing span direction is reduced to a single line providing pressurized air for all the components of all fluid actuators. At least two lines for each fluid actuator thus branch off from this single line which lead on the one hand via the feed line into the interaction chamber and on the other hand via the control feed line into the control pressure varying device. In this way it is ensured in a particularly simple manner that a low-cost and easily installed distribution across the wing span direction of a wing of an aircraft takes place, with the inventive functionality of a fluid actuator of the invention nevertheless being ensured in each position for each fluid actuator of the invention.

In such an embodiment it is particularly advantageous if a throttle valve is furthermore provided at least in the control feed line and/or a compressor in the feed line for the interaction chamber. In the feed line a clearly higher pressure or higher volume flow is typically required in order to generate the necessary volume flows of the volume pulses at the outlet openings than is the case in the control feed line for the control of the interaction chamber. If a common line is used, a variation of the necessary volume flows may take place in that each fluid actuator of the invention throttles the arriving high admission pressure, or the high volume flow, in its control feed line in order to arrive at a necessary maximum measure for the velocity in the control pressure varying device. Alternatively it is also possible to increase the velocity in the feed line or the pressure by means of the compressor in the feed line into the interaction chamber. A combination of a throttle valve in the control feed line and a compressor in the feed line into the interaction chamber are, of course, also conceivable in accordance with the present invention.

Another subject matter of the present invention is a flow body comprising a plurality of outlet openings and at least one fluid actuator of the invention or at least one blow-out device of the invention. Thus, for example, the flow body may be the main wing of an aircraft and the outlet openings may be provided on the trailing edge relative to the direction of flow upstream from subsequent control flaps at the main wing. Even outlet openings of a fluid actuator of the invention on the very control flaps are conceivable in order to stabilize flow present there, or to reattach to the control flaps a flow having already separated in this area.

With a blow-out device of the invention or with a fluid actuator of the invention it is thus possible to form a flow body of the invention that is optimized in regard of its aerodynamic properties. This optimization also relates to convexities of the wing where flows would otherwise separate, or to long extending paths of control flaps. As the corresponding flow is assisted by a fluid actuator of the invention, the aerodynamic efficiency may be enhanced to thereby reduce, for example, weight and size and thus also the drag of the control flaps or of a wing, respectively. Fluid actuators of the invention or blow-out devices of the invention thus contribute to an optimized flow body which optimizes an aircraft in terms of its efficiency.

BRIEF DESCRIPTION OF THE DRAWINGS

The present invention shall be explained in more detail by referring to the annexed figures of the drawings. Here the expressions "left", "right", "top" and "bottom" refer to an orientation of the figures of the drawings where reference symbols are legible in a normal manner.

FIG. 4a shows the control pressure varying device according to an embodiment of the present invention;

FIG. 4b shows the control pressure varying device of FIG. 4a with a diverted control flow;

FIGS. 10a-10c show different embodiments for the control line outlet device.

DETAILED DESCRIPTION

Figure 1:
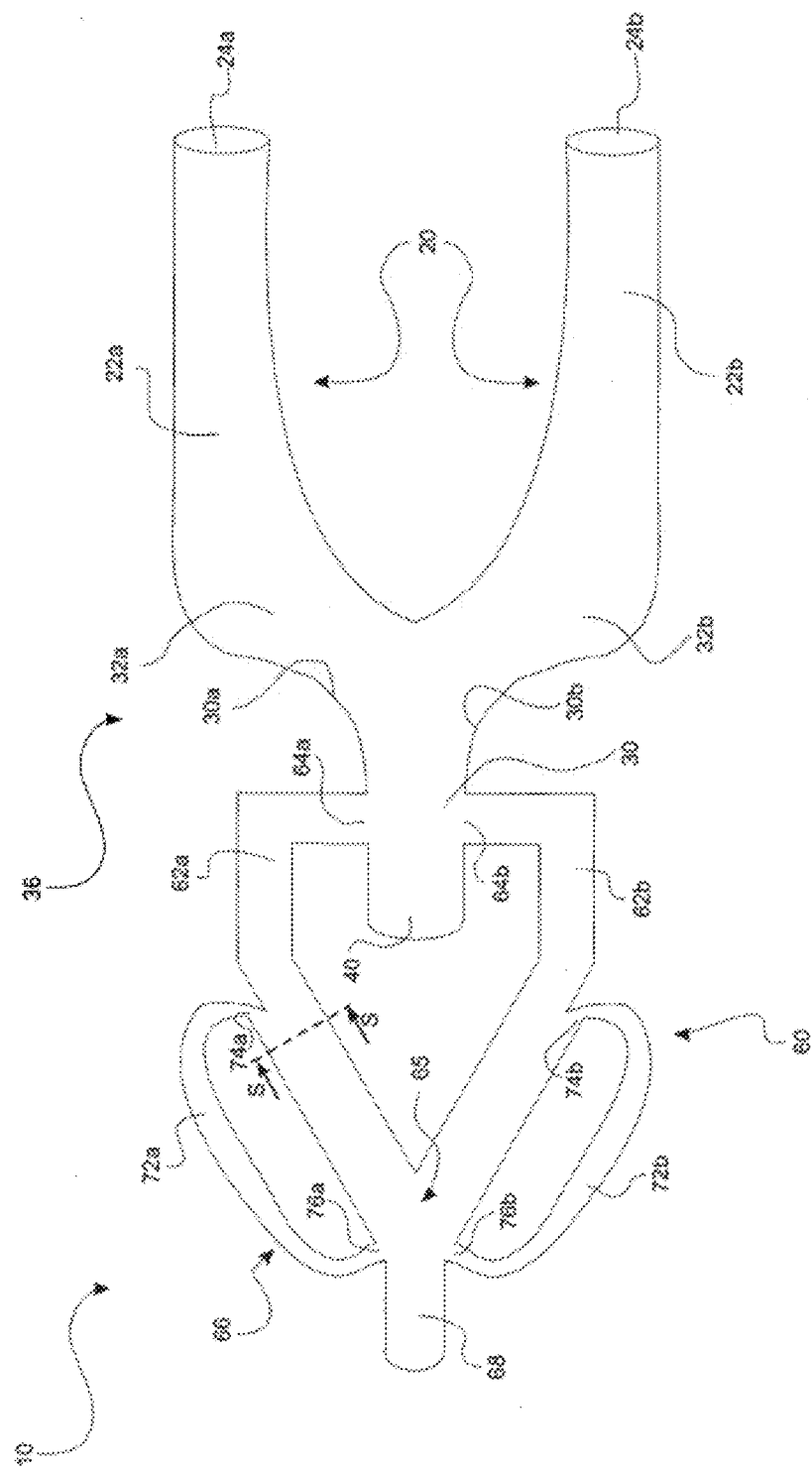
FIG. 1 shows an embodiment of a fluid actuator according to the present invention.

In FIG. 1 a first embodiment of a fluid actuator 10 of the invention is represented. The fluid actuator 10 of the embodiment of FIG. 1 comprises an outlet device 20 having two outlet openings 24a and 24b. The fluid actuator 10 of this embodiment thus serves to obtain a pulsation by distributing a fluid flow between the two outlet openings 24a and 24b.

In order to distribute air to the two outlet openings 24a and 24b, a feed line 40 is arranged in the fluid actuator 10 of FIG. 1 which introduces air, and thus flowing fluid, into an interaction chamber 30 which is represented in FIG. 1. Inside the interaction chamber 30 a flow division is performed, i.e. the supplied fluid flow from the feed line 40 is alternatingly distributed majoritarily to one of the two outlet lines 22a and 22b, as will be described later on. To this end the interaction chamber 30 represented in FIG. 1 comprises two flow lines 32a and 32b which are in fluid-communicating connection with the outlet lines 22a and 22b and via the latter with the outlet openings 24a and 24b. In other words, the fluid flow from the feed line 40 is alternatingly conducted majoritarily once via the upper control line 30a into the upper outlet line 22a and thus into the upper outlet line 24a. Following termination of the first pulse through this outlet opening 24a, the flow dividing device 36 changes the distribution of the fluid flow so that the fluid flow from the feed line 40 is diverted and flows via the lower flow line 32b into the lower outlet line 22b, to exit from the lower outlet opening 24b. When this second pulse is terminated, this process starts anew.

Diversion or switching over between the two flow lines 32a and 32b and thus switching over between the two outlet lines 22a and 22b or the outlet openings 24a and 24b takes place in accordance with the following description.

Two control lines 62a and 62b merge in the interaction chamber 30 via control openings 64a and 64b. If respective different control pressures are applied to these control openings 64a and 64b, then the flow in the interaction chamber 30 that is provided by the feed line 40 follows the side of the interaction chamber 30 presenting the control opening 64a or 64b having the relatively lower control pressure. In other words, between the two control openings 64a and 64b there exists a control pressure difference or a pressure gradient which results in the fluid flow from the feed line 40 being given a direction. If the lower control pressure is present at the lower control opening 64b, then the fluid flow from the feed line 40 is majoritarily conducted into the lower flow line 32b and thus into the lower outlet line 22b so as to exit from the lower outlet opening 24b. If, in contrast, the lower control pressure is applied at the control opening 64a above inside the interaction chamber 30, then the flow from the feed line 40 follows the upper flow line 32a into the upper outlet line 22a so as to exit from the upper outlet opening 24a. This functionality results from the vector addition between the flow vector of the flow from the feed line 40 and the flow vector of the flow from the control opening 64a or 64b having the higher control pressure. The resulting sum vector urges, as it were, the flow from the feed line 40 to the opposite side of the interaction chamber 40.

For the purpose of control via the interaction chamber 30, the control openings 64a and 64b which merge in the interaction chamber 30 are provided via the control lines 62a and 62b. In order to be able to alternatingly generate the different pressures at the two control lines, a control pressure varying device 60 is realized. This control pressure varying device 60 comprises two control lines 62a and 62b to each of which a respective feedback line 72a and 72b is allocated. Inside the respective control line 62a and 62b a respective control line outlet device 74a and 74b is arranged which withdraws fluid flow from the respective control line 62a and 62b and supplies it to the respective feedback line 72a and 72b. Furthermore each feedback line 72a and 72b comprises a control line inlet device 76a and 76b arranged in the branching section 65 of the control pressure varying device 60. The arrangement of the control line inlet devices 76a and 76b is selected such that the flow from the feedback line 72a and 72b flows out from the respective control line inlet device 76a and 76b substantially transversely to the direction of flow in the control feed line 68 and thus also transversely to the direction of flow in the branching section 65. The operation of the control hereby established is explained in the following while making reference to FIGS. 4a and 4b.

FIG. 4a shows a possible starting condition in which the greater proportion of the flow from the control feed line 68 is distributed to the upper control line 62b. The flow from the control feed line 68 accordingly is distributed via the branching section 65 of the control flow dividing device 66 to the upper control line 62b. Inside this control line 62b the control line outlet device 74b is arranged which withdraws a part of this fluid flow in the control line. The withdrawn flow is returned via the feedback line 72b, i.e., contrary to the direction of flow in the control line 62b. At the end of the feedback line 72 a discharge of the returned flow from the feedback line 74b takes place via the control line inlet device 76b.

Admission into the control line 62b or into in the branching section 65, respectively, takes place transversely to the direction of flow in this position. In this way the flow from the control feed line 68 is influenced such as to be urged downward in FIG. 4a, i.e. into the opposite control line 62a. After the flow majoritarily flows into the lower control line 62a, the flow in the feedback line 72b strongly decreases, and on the opposite side an opposite feedback flow forms via the control line outlet device 74a, the feedback line 72a, and the control line inlet device 76a. Once the feedback flow in the feedback line 72a has been realized fully, the corresponding flow exits from the lower control line outlet device 76a transversely to the direction of flow in the branching section 65 and in turn urges the corresponding flow in the branching section 65a into the opposite, now upper control line 62b. The flow in the feedback line 72a in the lower range of the control pressure varying device 60 decreases and the situation as represented in FIG. 4a comes about. In other words, in the operational situation the flow changes between the two control lines 62a and 62b due to the alternating influence on the flow in the branching section 65 from the control line outlet devices 76a and 76b. The alternation frequency may be situated in a range from 50 Hz to 250 Hz. Operation at a frequency in a range from 140 Hz to 160 Hz is particularly effective.

Figure 2:
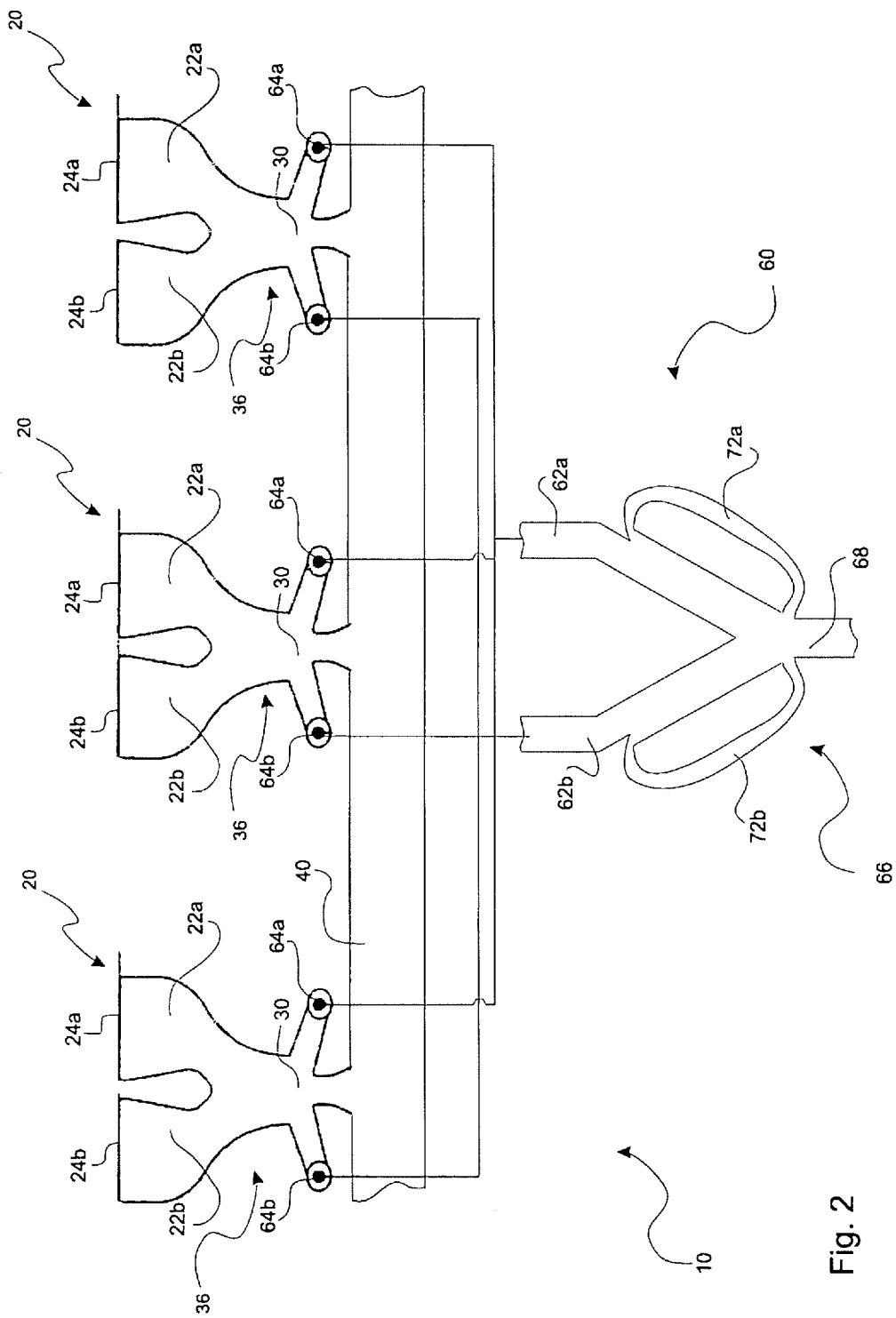
FIG. 2 shows another embodiment of a fluid actuator of the invention.

In FIG. 2 a variation of a fluid actuator 10 of the invention comprising a multiplicity of interaction chambers 30 and outlet devices 20 is represented. As the control pressure varying device 60 a device is provided as may be seen, e.g., in FIG. 1 or in FIGS. 4a and 4b. Here, however, not a single outlet device 20 having a single interaction chamber 30 is arranged downstream, but rather a multiplicity, in particular three outlet devices 20 having three interaction chambers 30. Each one of these interaction chambers 30 has a port of two respective control lines 62a and 62b via corresponding control openings 64a and 64b. However for each of the control openings 64a and 64b a connection with the common control lines 62a and 62b of the common control pressure varying devices 60 is provided. In other words, despite the use of a a multiplicity of outlets 24a and 24b the complexity of such a system is restricted to a minimum because a common control pressure varying device 60 may be employed. In addition a common feed line 40 is moreover used which conducts the fluid flow into each of the interaction chambers 30. This disposition equally reduces the complexity of such a system.

Figure 3:
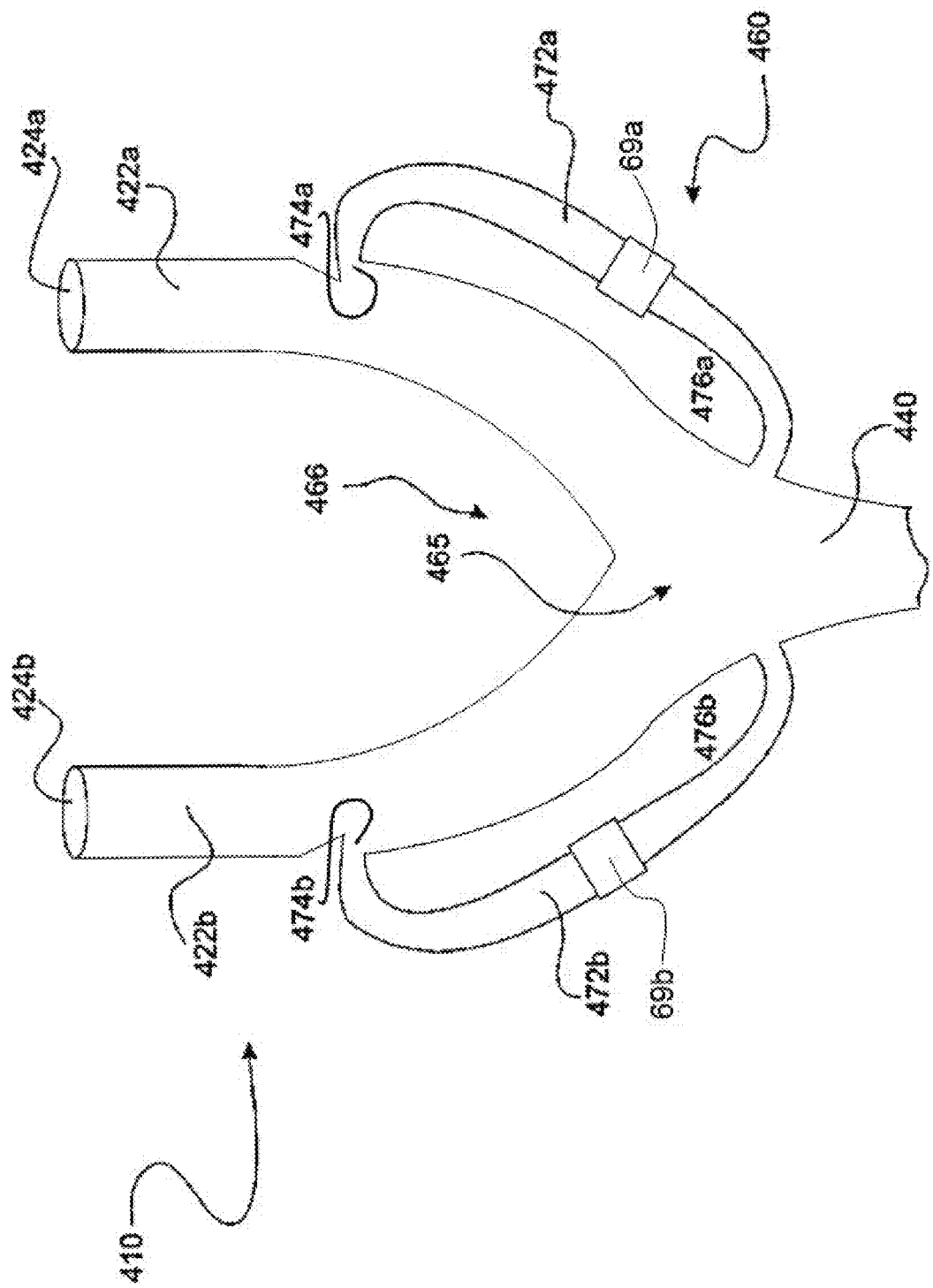
FIG. 3 shows another embodiment of a fluid actuator of the invention.

FIG. 3 shows a variant in accordance with another subject matter of the present invention wherein the control pressure varying device 60 is used as a varying device 460 for the further subject matter of the present invention, namely, a fluid actuator 410. The fluid actuator 410 is configured such that it substantially comprises a combination of the outlet device 20 and of the control pressure varying device 60 in a common and thus more compact fluid actuator 410.

The fluid actuator 410 of this embodiment comprises two outlet openings 424a and 424b. These are supplied with fluid flow via the respective outlet line 422a and 422b. In order to distribute fluid flow from a common feed line 440 to the two outlet lines 422a and 422b, a device, i.e., a varying device 460 is provided as substantially corresponds in its operation to the control pressure varying device 60 of the embodiments explained in the foregoing. In other words, a branching section 465 is arranged downstream from the feed line 440 in the direction of flow. For the purpose of distribution a flow dividing device 466 is provided. In order to perform the flow division, one respective feedback line 472a, 472b is provided for each outlet line 422a and 422b. Each one of these feedback lines 472a and 472b comprises an outlet line outlet device 474a and 474b as well as an outlet line inlet device 476a and 476b. The operation is identical with the control pressure varying device 60 of the embodiment described in the foregoing. In particular, flow is withdrawn via the respective outlet line outlet device 474a and 474b from the respective outlet line 422a and 422b. The withdrawn flow is returned in the respective condition, i.e. once in the one outlet line 422a and once in the other outlet line 422b, via the associated feedback line 472a and 472b against the direction of flow in the outlet line 422a and 422b. The returned flow is ejected via an outlet line inlet device 476a and 476b substantially transversely to the flow in the branching section 465. The ejection in this respect brings about the sudden changeover of the flow to the opposite outlet line 422a and 422b. It may be advantageous in a fluid actuator of the invention if a throttle valve 69a, 69b is arranged in at least one of the feedback lines 472a, 472b in order to influence the velocity of the flow in this feedback line 472a, 472b to achieve the desired operation. Hereby it is possible to adjust an alternating operation, as was already explained in the foregoing in regard of the control pressure varying device 60 of the previous embodiments.

In other words, a fluid actuator 410 of the invention as in FIG. 3 may be used for directly generating a pulsation at the outlet openings 424a and 424b. The detour via an interaction chamber is not necessary in this embodiment. On the other hand, this embodiment is limited to a maximum amount of volume flow, for an energy dissipation is generated through the feedback lines inside the fluid actuator 410. Above a certain minimum volume flow for the throughput from the outlet openings 424a and 424b, a fluid actuator 10 of the embodiment discussed first is provided with higher efficiency.

Furthermore, specialized realizations of the walls in the control lines 62a and 62b and in the flow lines 32a and 32b may be seen in FIG. 1. The walls of the control pressure varying device 60 are realized as convexly curved walls 60a and 60b. As a result of this convex curvature, a flow applied by periodical changeover of the flow from the control supply line to the one wall 60a or the other wall 60b stably attaches itself to the corresponding wall 60a or 60b. This formation of the respective wall 60a and 60b thus stabilizes the flow applied in this manner.

The convexly curved realization of the walls 30a and 30b of the interaction chamber 30 operates likewise. In this case the application is, however, not effected by changeover by means of the control line inlet devices 76a and 76b but by the pressure difference at the control openings 64a and 64b. The slight pressure difference between the control openings 64a and 64b in a sense urges the arriving fluid flow from the feed line 40 once onto the one wall 30a and once onto the other wall 30b. Having been applied to the respective wall 30a or 30b, the flow stabilizes itself along the convex curvature of the wall 30a or 30b and is thus majoritarily conducted into the corresponding flow line 32a and 32b. In other words, both in the control pressure varying device 60 and in the interaction chamber 30 the stabilization of the respective applied and deflected flow may be effected by correspondingly realized walls 60a, 60b, 30a and 30b, whereby the proportion of the distribution to the respective preferred control line 62a or 62b or the respective preferred flow line 32a or 32b may be increased.

Figure 5:
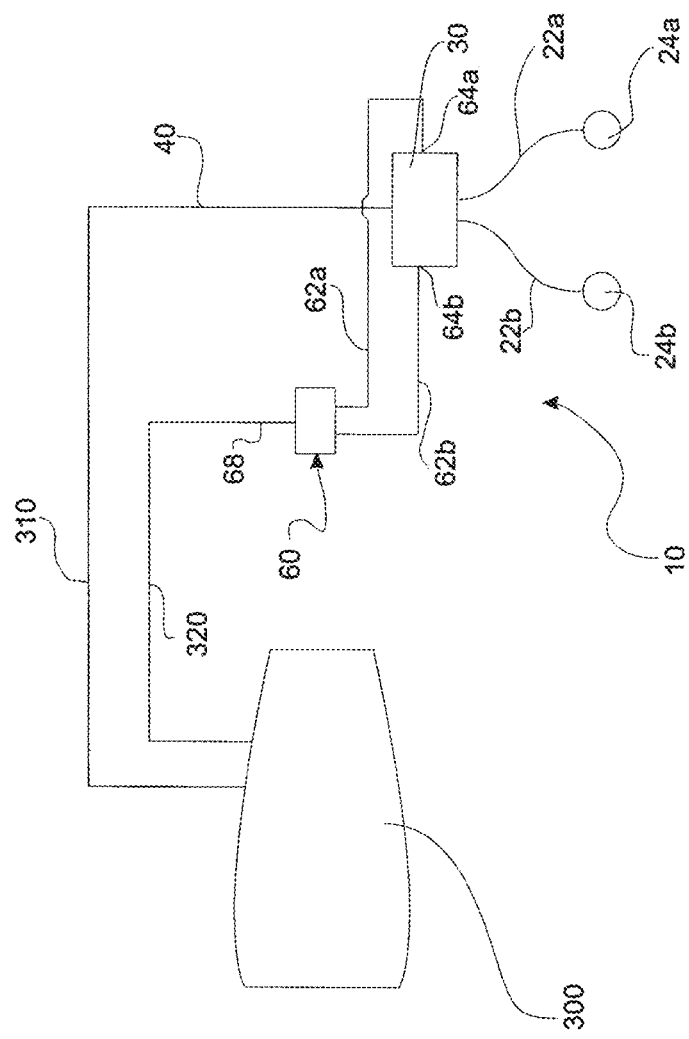
FIG. 5 shows a first embodiment of a blow-out device of the invention.

FIG. 5 shows a first embodiment of a blow-out device of the invention 200 in association with a flow body 500. The flow body 500 may, for example, be the main wing of an aircraft, and the outlet openings 24a, 24b may be provided on the trailing edge relative to the direction of flow before subsequent control flaps on the main wing. The outlet openings 24a, 24b of a fluid actuator of the invention may also be arranged on the very control flaps in order to stabilize flows present there, or to reattach a flow already having become detached in this range to the control flaps. Here a fluid actuator 10 of the present invention is represented schematically. This fluid actuator 10 comprising interaction chamber 30, control pressure varying device 60 and corresponding control passages 62a, 62b and outlet lines 22a and 22b as well as control openings 64a and 64b and outlet openings 24a and 24b may be realized, e.g., by an embodiment of FIG. 1. The feed line 40 is connected to a supply line 310 which in turn is in fluid-communicating connection with a pressurized air supply device 300. The same is true for the control feed line 68 that is in connection with a control supply line 320 which in turn also receives its pressurized air from the pressurized air supply device 300. The pressurized air supply device 300 may, for example, be the turbine of an aircraft which provides bleed air for the two supply lines 310 and 320. Alternatively the pressurized air supply device 300 may also be realized in some other manner, for example through openings at the bottom side of a flow body through which air can enter into the corresponding supply line 310 and/or 320.

In the case of the particularly simple and cost-efficient and low-maintenance embodiment of FIG. 5 not a single movable part is necessary for ensuring the functionality of the fluid actuator 10 of the invention. Furthermore it is sufficient if the supply line 310 allows for a sufficiently large cross-section for providing a volume flow of the pulsation at the outlet openings 24a and 24b. The control supply line 320 may present a clearly smaller cross-section, for in order to generate different control pressures at the control openings 64a and 64b it is possible to work with clearly lower volume flows.

Figure 6:
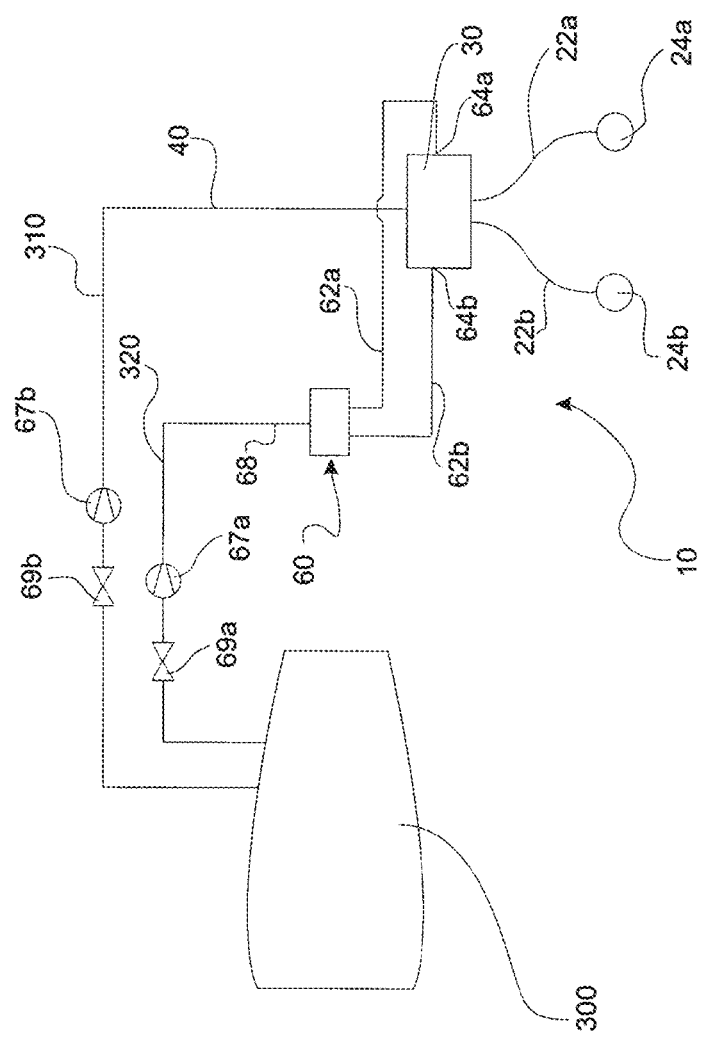
FIG. 6 shows another embodiment of a blow-out device of the invention.

For fields of use where the pressurized air supply device 300 does not have any activity of its own or no controllable activity, an embodiment of FIG. 6 is advantageous. Thus it is advantageous, for example in a pressurized air supply device 300 having the form of an opening which draws pressurized air from an enveloping flow around a flow body, if the variable flow which can not be influenced actively is adapted to be controlled actively inside the blow-out device 200. The active control in the embodiment of FIG. 6 is effected in two ways or in two directions, respectively.

On the one hand, throttle valves 69a and 69b are provided in both supply lines 310 and 320. With the aid of these throttle valves 69a and 69b it is possible to throttle the arriving fluid flow, i.e. to decelerate its velocity, or to minimize the volume flow. Vice versa it is also possible with the aid of compressors 67a and 67b arranged behind—or contrary to the representation of FIG. 6 before—the throttle valves 69a and 69b to increase the velocity of the fluid flow or to increase the volume flow, respectively. By means of these compressors 67a and 67b a pressure increase or an increase of the volume flow may be carried out. With corresponding sensors it is possible in this way for a substantially constant status to be adjusted and remain adjusted both in the control pressure varying device 60 and in the interaction chamber 30, in that the variation of the pressurized air supply device 300 may be compensated, as it were, by means of the combination of compressors 67a and 67b with the throttle valves 69a and 69b.

Figure 7:
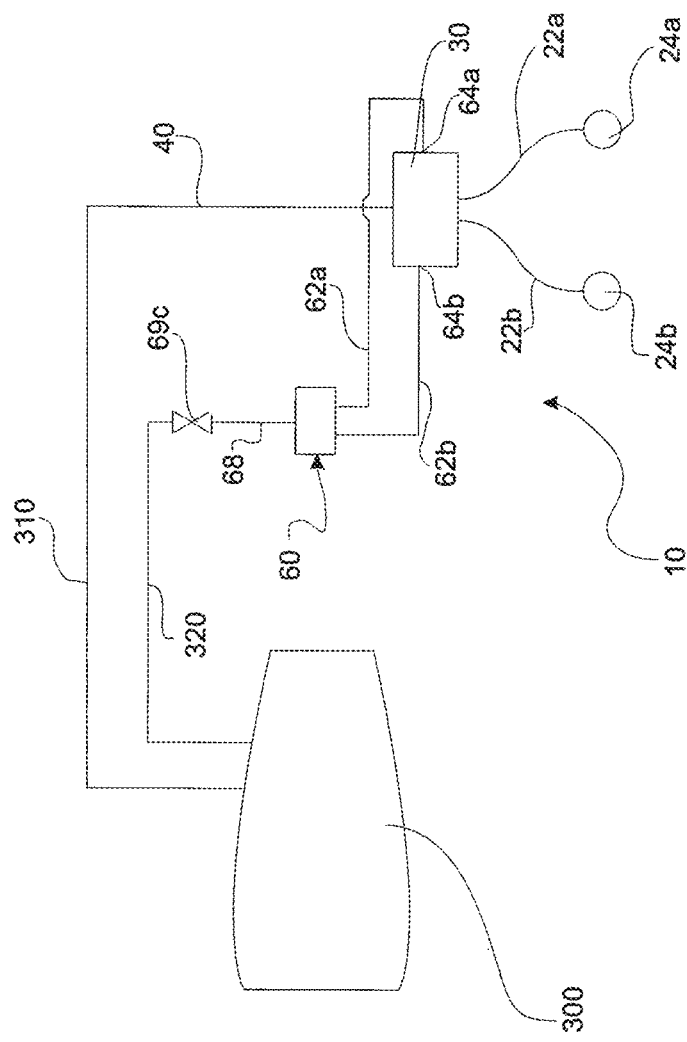
FIG. 7 shows another embodiment of a blow-out device of the invention.

FIG. 7 shows an alternative embodiment for FIG. 6. Here a throttle valve 69c is present in the control feed line 68 of the fluid actuator 10. Hereby the entire complexity, including the throttle valve 69c, is provided in the fluid actuator 10. The supply lines 310 and 320 may be configured in a correspondingly simple manner. The two embodiments of FIGS. 6 and 7 may, of course, also be combined with each other, so that throttle valves may be provided both in the supply lines 310 and 320 and also in the control feed line 68 and/or the feed line 40.

If a more complex system is desired for a blow-out device 200 of the invention, in particular a system comprising a multiplicity of fluid actuators 10 of the present invention, then such a system may be expanded at will by providing central supply lines 310 and 320.

Figure 8:
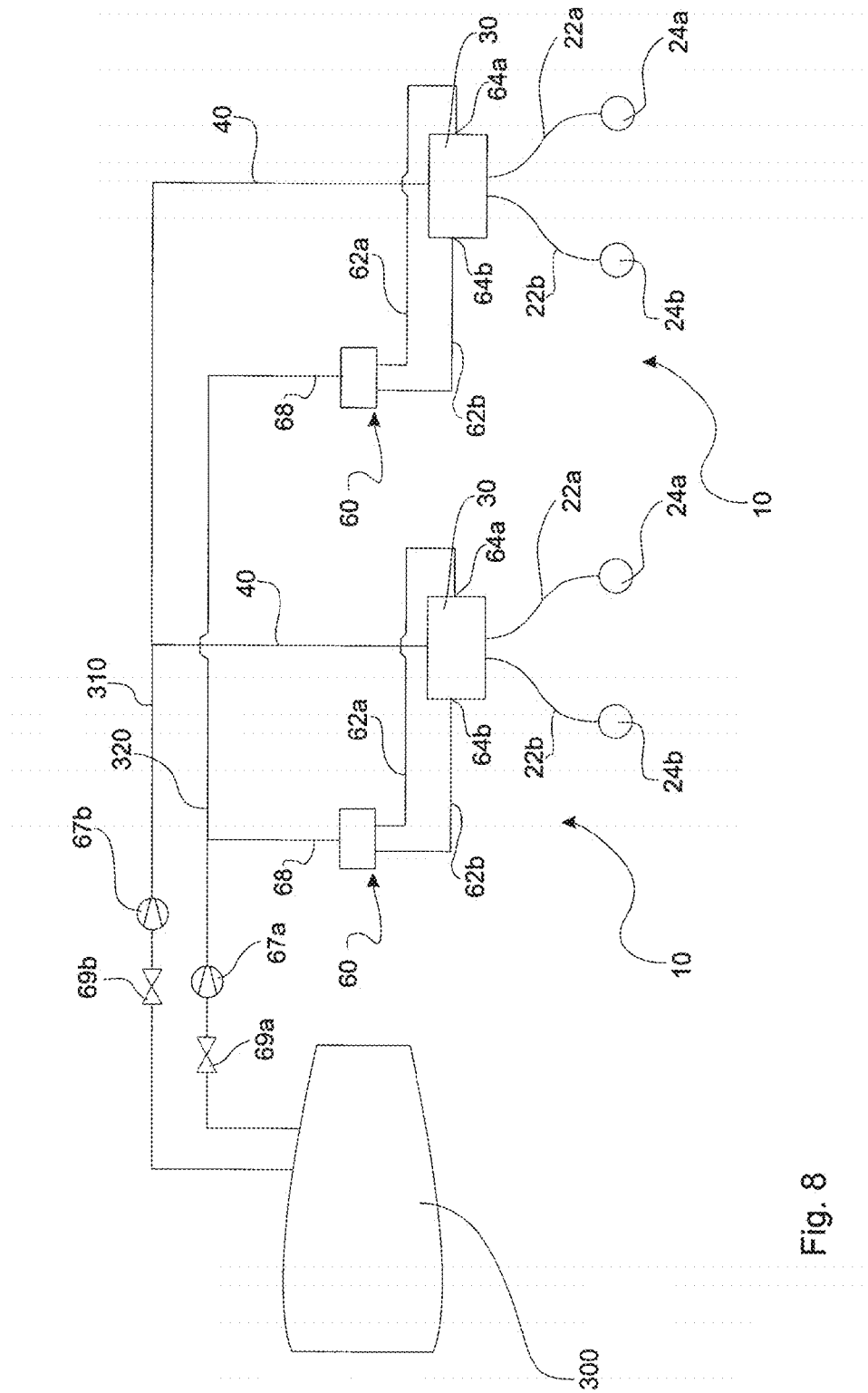
FIG. 8 shows another embodiment of a blow-out device of the invention.

An example of a corresponding outlet device 200 is represented in FIG. 8. In this case two fluid actuators 10 are arranged as an example of a multiplicity of fluid actuators 10, with two fluid actuators 10 being supplied with pressurized air by shared supply lines 310 and 320. The supply line 310 presents branchings into all of the supply lines 40, so that all interaction chambers 30 of all fluid actuators 10 may be supplied with pressurized air from one common supply line 310. Likewise, the control supply line 320 offers branchings into all control supply lines 68 of all fluid actuators 10, so that all of the control pressure varying devices may also be supplied with pressurized air from one common control supply line 320.

Figure 9:
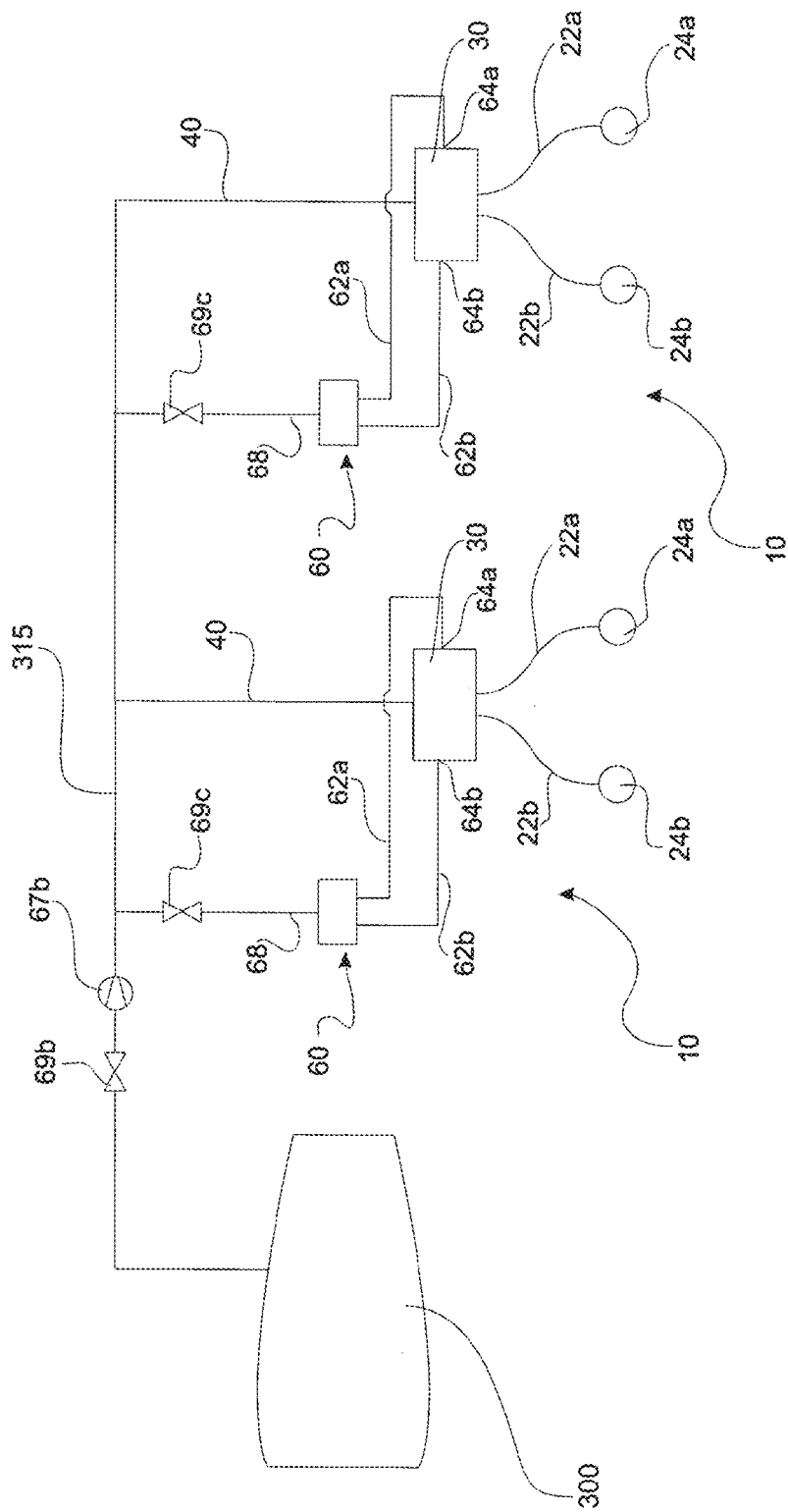
FIG. 9 shows another embodiment of a blow-out device of the invention.

This embodiment of FIG. 8 may even be simplified further, as is represented in FIG. 9. Here the two separate supply lines 310 and 320 were combined into a common supply line 315. From the latter two branchings per fluid actuator 10 of the invention are branched off, with one being the feed line 40 and the other one the control feed line 68 of the respective fluid actuator 10. As in such a case the fluid flow may also only be controlled or regulated jointly with regard to pressure and velocity in the common supply line 315 via a common throttle 69b and/or a common compressor 67b, it is advantageous in such a case if the individual supply lines furthermore offer separate possibilities of regulation.

In FIG. 9 a throttle valve 69c is provided in each control feed line 68 for this possibility of regulation. Thus it is possible, despite a high volume flow rate and great pressure in the common supply line 315 which are sufficient to generate the required throughput in the feed line 40, to apply a clearly lower pressure and a clearly lower volume flow to the control feed line 68 via the throttle valve 69c. Hereby the loss for the feed line 40 due to the common supply of the common supply line 315 is minimized.

FIGS. 10a and 10b show different variants of the control line outlet device 74a. The latter may differently be arranged in the respective control line 62. FIG. 10a shows a variant where an opening of the control line outlet device 74a is realized substantially concentrically with the control line 62a. In addition, in this embodiment the opening of the control line outlet device 74a is arranged substantially centrally inside the control line 62a. In this way the flow for the feedback line 74a may be drawn substantially centrally from the flow in the control line 62a, so that possible marginal effects in the control line 62a may be disregarded when applying a flow to the feedback line 72a. For this embodiment, however, a line is necessary which projects from the feedback line to the center of the control line 62a, as may be seen in FIG. 10a.

FIG. 10b shows a variant where the control line outlet device 74a is arranged in a marginal portion of the control line 62a. Such an embodiment presents the advantage that only a low additional resistance is created, for apart from the wall of the control line outlet device 74a no additional resistance is required inside the control line 62a. The variant of FIG. 10b may be developed further to the effect that the flow around the opening of the control line inlet device 74a is adapted further to the aerodynamics in the control line 62a. In particular it is advantageous if the cross-sectional area of the opening of the control line outlet device 74a is limited to a minimum and gap-type areas as at the margins of the opening of the control line outlet device 74a in the version of FIG. 10b are avoided.

It is self-evident that the described embodiments are merely examples which do not restrict the scope of the present invention. It is rather possible, whenever this is technically meaningful, to freely combine the technical possibilities of realization described for the individual embodiments among each other without departing from the framework of the present invention.

LIST OF REFERENCE SYMBOLS 10 fluid actuator
20 outlet device
22a outlet line
22b outlet line
24a outlet opening
24b outlet opening
30 interaction chamber
30a convexly curved wall
30b convexly curved wall
32a flow line
32b flow line
36 flow dividing device
40 feed line
60 control pressure varying device
62a control line
62b control line
62c control line
64a control opening
64b control opening
65 branching section
66 control flow dividing device
67a compressor
67b compressor
68 control feed line
69a throttle valve
69b throttle valve
72a feedback line
72b feedback line
74a control line outlet device
74b control line outlet device
76a control line inlet device
76b control line inlet device
200 blow-out device
300 pressurized air supply device
410 fluid actuator
420 outlet device
422a outlet line
422b outlet line
424a outlet opening
424b outlet opening
440 feed line
460 varying device
465 branching section
466 flow dividing device
472a feedback line
472b feedback line
474a outlet line outlet device
474b outlet line outlet device
476a outlet line inlet device
476b outlet line inlet device
500 flow body

The invention claimed is:

1. A fluid actuator for influencing a flow along a flow surface by pulsating ejection of a fluid flowing through the fluid actuator, the fluid actuator comprising
a plurality of outlet devices, wherein each outlet device comprises at least two separate outlet openings for ejection of the fluid and an outlet line corresponding with each outlet opening and merging into the outlet openings,
a plurality of interaction chambers, one for each outlet device, wherein each interaction chamber is in fluid-communicating connection with the separate outlet openings of a respective outlet device and comprises one flow dividing device for dividing a feed fluid flow into the outlet lines of the respective outlet device,
a common feed line which conducts the feed fluid flow into all of the interaction chambers, and
a common control pressure varying device comprising a control flow dividing device,
wherein control lines for mutually influencing the fluid flow from the common feed line are connected to the control flow dividing device, the control lines each comprising corresponding control openings which conduct a control fluid flow into all of the interaction chambers to generate respective different control pressures by supplying the control fluid flow at respective different control pressures into the plurality of interaction chambers, and
wherein each control line comprises a feedback line which merges into the control flow dividing device so that supplying the control fluid flow into the control flow dividing device generates an alternating control fluid flow from the control lines to alternatingly cause a majority of the feed fluid flow to pass into one of the outlet lines of each interaction chamber and, thus, causing a pulsating flow in the outlet lines, wherein the fluid flowing through the fluid actuator comprises at least the feed fluid flow and the control fluid flow.

2. The fluid actuator according to claim 1, wherein at least one of the plurality of interaction chambers is configured such that, by supplying the control fluid flow through a first of the control lines at a greater pressure than through the other control lines, a majority of the feed fluid flow is correspondingly deflected into the outlet line corresponding to the first control line through which the control fluid flow is supplied at a greater pressure than through the other control lines.

3. The fluid actuator according to claim 1, wherein the control pressure varying device further comprises a control feed line and the control lines, the control flow dividing device having a branching section for branching the control fluid flow from the control feed line into each of the control lines and the corresponding feedback lines which are connected to the respective control line through at least one control line outlet device downstream from the branching section and at least one control line inlet device in a region of the branching section upstream from the at least one control line outlet device in a direction of the control fluid flow.

4. The fluid actuator according to claim 3, wherein the control pressure varying device is configured such that the control fluid flow directed transversely to the flow in the control feed line exits from that control line inlet device to divert a majority of the control fluid flow in the control feed line into the control line opposite the control line inlet device.

5. The fluid actuator according to claim 1, wherein the control pressure varying device is configured such that the control fluid flow being diverted into the control lines and, consequently, also to the outlet lines occurs successively and alternatingly.

6. The fluid actuator according to claim 3, wherein the control line outlet devices are at least partly directed against the direction of the control fluid flow and are situated in the control fluid flow so that a part of the control fluid flow enters the corresponding feedback line.

7. The fluid actuator according to claim 1, wherein, in at least one of the feedback lines, a throttle valve is arranged to influence a flow velocity in the at least one feedback line which has the throttle valve.

8. The fluid actuator according to claim 3, wherein at least one throttle valve for changing a flow velocity of the control fluid flow into the control flow dividing device is arranged in the control feed line.

9. The fluid actuator according to claim 1, wherein the plurality of interaction chambers have convexly curved walls in a direction of the outlet lines so that a fluid flow along a respective one of the convexly curved walls causes a stable flow along this convexly curved wall into the respective outlet line.

10. The fluid actuator according to claim 3, wherein the control feed line of the control pressure varying device has convexly curved walls in a direction of the control lines so that a fluid flow along a respective one of the convexly curved walls causes a stable flow along this convexly curved wall into the respective control line.

11. A blow-out device comprising at least one fluid actuator according to claim 1, the blow-out device further comprising a throttle valve which is in fluid-communicating connection with at least one control feed line of one or more of the at least one fluid actuator and controls a velocity of the control fluid flow into the control feed line.

12. The blow-out device according to claim 11, wherein the throttle valve is in fluid-communicating connection with at least two control feed lines of at least two of the at least one fluid actuator and is configured to regulate respective velocities of the control fluid flowing into the control feed lines.

13. A flow body comprising at least one fluid actuator according to claim 1.

14. A fluid actuator for influencing a flow along a flow surface by pulsating ejection of a fluid flowing through the fluid actuator, the fluid actuator comprising:
   a plurality of outlet devices, wherein each outlet device comprises at least two separate outlet openings for ejection of the fluid and an outlet line corresponding with each outlet opening and merging into the outlet openings;
   at least two interaction chambers, wherein each interaction chamber is in fluid-communicating connection with the separate outlet openings of the respective outlet device and comprises one flow dividing device for dividing a feed fluid flow into the outlet lines of the respective outlet device;
   a feed line which conducts the feed fluid flow into all of the interaction chambers, and
   a common control pressure varying device comprising a control flow dividing device,
      wherein control lines for mutually influencing the fluid flow from the common feed line are connected to the control flow dividing device, the control lines each comprising corresponding control openings which conduct a control fluid flow into all of the interaction chambers to generate respective different control pressures by supplying the control fluid flow at respective different control pressures into the at least two interaction chambers, and
      wherein each control line comprises a feedback line which merges into the control flow dividing device so that supplying the control fluid flow into the control flow dividing device generates an alternating control fluid flow from the control lines to alternatingly cause a majority of the feed fluid flow to pass into one of the outlet lines of each interaction chamber and, thus, causing a pulsating flow in the outlet lines,
   wherein the fluid flowing through the fluid actuator comprises at least the feed fluid flow and the control fluid flow, and
      wherein the control pressure varying device further comprises a control feed line and the control lines, the control flow dividing device having a branching section for branching the flow from the control feed line into each of the control lines and the corresponding feedback line which is connected to the respective control line through at least one control line outlet device downstream from the branching section and at least one control line inlet device in a region of the branching section upstream from the corresponding control line outlet device in a direction of the control fluid flow.

15. The fluid actuator according to claim 14, wherein the control pressure varying device is configured such that the control flow directed transversely to the flow in the control feed line exits from that control line inlet device to divert a majority of the control fluid flow in the control feed line into the control line opposite the control line inlet device.

16. The fluid actuator according to claim 14, wherein the control line outlet devices are at least partly directed against the direction of the control fluid flow and are situated in the control fluid flow so that a part of the control fluid flow enters the corresponding feedback line.

17. The fluid actuator according to claim 14, wherein the control pressure varying device is configured such that the control flow directed transversely to the flow in the control feed line exits from that control line inlet device to divert a majority of the control fluid flow in the control feed line into the control line opposite the control line inlet device.

18. The fluid actuator according to claim 14, wherein the control feed line of the control pressure varying device has convexly curved walls in a direction of the control lines so that a fluid flow along a respective one of the convexly curved walls causes a stable flow along this convexly curved wall into the respective control line.

* * * * *